United States Patent [19]

Rohra et al.

[11] Patent Number: 5,028,207
[45] Date of Patent: Jul. 2, 1991

[54] ARRANGEMENT FOR ADJUSTING THE ROTOR BLADES OF A PROPFAN TURBOPROP ENGINE

[75] Inventors: Alois Rohra, München; Helmut-Arnd Geidel, Karlsfeld, both of Fed. Rep. of Germany

[73] Assignee: MTU Munchen GmbH, Fed. Rep. of Germany

[21] Appl. No.: 433,543

[22] Filed: Nov. 8, 1989

[30] Foreign Application Priority Data

Nov. 9, 1988 [DE] Fed. Rep. of Germany ....... 3837994

[51] Int. Cl.[5] ...................... B64C 11/00; B64C 27/00
[52] U.S. Cl. ............................... 416/129; 416/157 A; 416/157 B
[58] Field of Search ............... 416/126, 127, 128, 129, 416/157 A, 157 B

[56] References Cited

U.S. PATENT DOCUMENTS

| | | | |
|---|---|---|---|
| 1,042,980 | 10/1912 | Shawver | 417/46 |
| 2,297,214 | 9/1942 | Gosslau | 416/129 |
| 2,380,889 | 7/1945 | Waseige | 416/127 |
| 2,394,299 | 2/1946 | Friedrich | 416/127 |
| 2,455,239 | 11/1948 | Doussain | 416/127 |
| 2,948,343 | 8/1960 | Conn et al. | 416/129 |
| 3,153,907 | 10/1964 | Griffith | 416/129 |
| 4,738,261 | 3/1988 | Wright et al. | 416/127 |
| 4,738,589 | 4/1988 | Wright | 416/127 |
| 4,842,484 | 6/1989 | Johnson | 416/127 |

FOREIGN PATENT DOCUMENTS 3611792 6/1986 Fed. Rep. of Germany .
3614157 6/1986 Fed. Rep. of Germany .

*Primary Examiner*—Edward K. Look
*Assistant Examiner*—Hoang Nguyen
*Attorney, Agent, or Firm*—Evenson, Wands, Edwards, Lenahan & McKeown

[57] ABSTRACT

An arrangement for the adjusting of rotor blades of a propfan turboprop engine equipped with two counter-rotating propfan rotors has a number of double-toothed planet wheels which are fastened in a rotatably disposed web. The web is supported on the side of the housing by planet members disposed on one of the propfan rotors. The two toothings of the planet wheels are in operative connection with ball spindle adjusting rings. Using an adjusting motor, a relative movement of the web can be achieved with respect to the housing, whereby the blades of two counter-rotating rotor blade rings can be swivelled. According to the invention, an adjustment of rotor blades will also be possible when no stationary housing parts are available for the support.

16 Claims, 3 Drawing Sheets

ARRANGEMENT FOR ADJUSTING THE ROTOR BLADES OF A PROPFAN TURBOPROP ENGINE

BACKGROUND AND SUMMARY OF THE INVENTION

The invention relates to an arrangement for adjusting the rotor blades of a propfan turboprop engine having two counter-rotating propfan rotors which are driven by two turbines by means of separate concentric shafts disposed in a housing. Adjusting rings which can be rotated in circumferential direction and are kinematically coupled with two rotor blade rings are arranged axially behind one another.

An arrangement of this type is known, for example, from German Published Unexamined Patent Application (DE-OS) 36 14 157. In this arrangement, two propfan rotors are arranged radially outside the turbines of the gas turbine engine to be driven. In this case, the constructive design of an adjusting arrangement for the propfan blades is not critical since stationary housing parts are available in the surroundings of the adjusting arrangement which are required for supporting the adjusting forces. The particular disadvantage of this construction is that the hot combustion gases are guided around the adjusting arrangement and result in thermally caused imprecisions. In addition, the thermal stress to the adjusting arrangement is extremely high. Gearless variants of propfan turboprop engines of this type can be mounted without any problems only at the tail of the airplane and, for transmitting forces from the driving low-pressure turbine to the fan blades, require an expensive and heavy frame construction.

In the case of a propfan engine where the propfan blades are located in front, for example, according to German Published Unexamined Patent Application (DE-OS) 36 11 792, these aerodynamic disadvantages do not occur. The previously known engines have a working turbine which is coupled with the two counter-rotating propfan blade rings by way of a step-down gear. The step-down gear, which is arranged in the area radially inside the propfan blade rings, is supported at stationary housing parts. Thus, also in this case, the accommodation and support of adjusting arrangements for the swivelling of propfan blades is not critical. However, this type of a gear has an extremely high weight because high outputs must be processed. In turn, this high weight is a disadvantage because it increases the take-off weight of the airplane which has an unfavorable effect on the economical aspects of the airplane. In addition, a gear reduces the reliability of the engine.

It is an object of the present invention to provide an adjusting arrangement of the type mentioned above which permits a precise adjustment of the rotor blades of both propfan rotors and thus an adaptation to varying conditions of flight.

According to the invention, this object is achieved by providing an arrangement wherein the adjusting rings are coupled by means of a planet wheel gear which has a number of double-toothed planet wheels which are fastened to a rotatably disposed web, the web being supported on the side of the housing by means of planet members disposed on one of the propfan rotors, and wherein the toothings which are in operative connection with the adjusting rings, are dimensioned such that when the rotational speed ratio of the propfan rotors is fixed, no relative movements occur of the adjusting rings.

The arrangement according to the invention has the advantage that it is possible to introduce the reaction forces required for the adjusting into the engine housing, although the propfan rotor, which is away from the housing, has no possibility for a direct support in the housing.

In a preferred construction of the invention, the rotational speeds of the two shafts are in a geometrically fixed relationship to one another. In particularly preferred embodiments, the rotors are to rotate at an oppositely identical rotational speed. This is achieved by providing in the engine, for example, in the area of the turbines, one or several toothed wheels which mate with both shafts and thus define the fixed rotational speed.

According to preferred constructions of the invention, an adjusting motor is supported in the first rotor and is in operative connection with both adjusting rings; i.e., one rotating movement relative to the first rotor is introduced directly into the first adjusting ring and by way of corresponding intermediate members, into the second adjusting ring.

According to an alternative construction of the invention in which the shafts are not synchronized with respect to one another and thus the rotational speeds are not fixedly coupled with one another, these can freely adjust themselves depending on the load absorbed at the rotor blades. In this case, the balancing of moments in the propfan rotors is produced by the free blade adjustment.

If the operating condition of the existing equilibrium of moments changes such that one of the propfan rotors absorbs less work, the turbine stage coupled with it endeavors to increase its rotational speed. The rising of the respective shaft speed now causes the blade adjusting mechanism according to the invention to adjust the blade such that the fan stage again absorbs more work whereby the shaft speed is lowered again. If the rotor blades are loaded more, the turbine speed will decrease, and the rotor blades are moved into a position of less load, whereby the turbine speed increases again. This control applies to both propfan rotors because they are coupled with one another by means of the wheel system according to the invention. In this case, the wheel system is preferably designed such that, when the rotational speed of the propfan rotors is commensurate but opposed, no relative movements take place in the adjusting system.

A preferred further development of the invention provides that an adjusting motor is provided which is supported in the housing, by means of which an additional adjustment of the rotor blade rings is possible. As a result, in addition to the automatically functioning balancing control, a blade adjustment may be superimposed by means of which, for example, the engine may be adjusted to reversed thrust. The arrangement has the significant advantage that the adjusting motor required for the blade adjustment does not rotate along but is stationarily supported in the housing. As a result, the energy supply to the motor may take place in a simple manner. In addition, this arrangement permits a fast exchange of a defective motor.

Other objects, advantages and novel features of the present invention will become apparent from the following detailed description of the invention when considered in conjunction with the accompanying drawings.

DETAILED DESCRIPTION OF THE DRAWINGS

Figure 1:
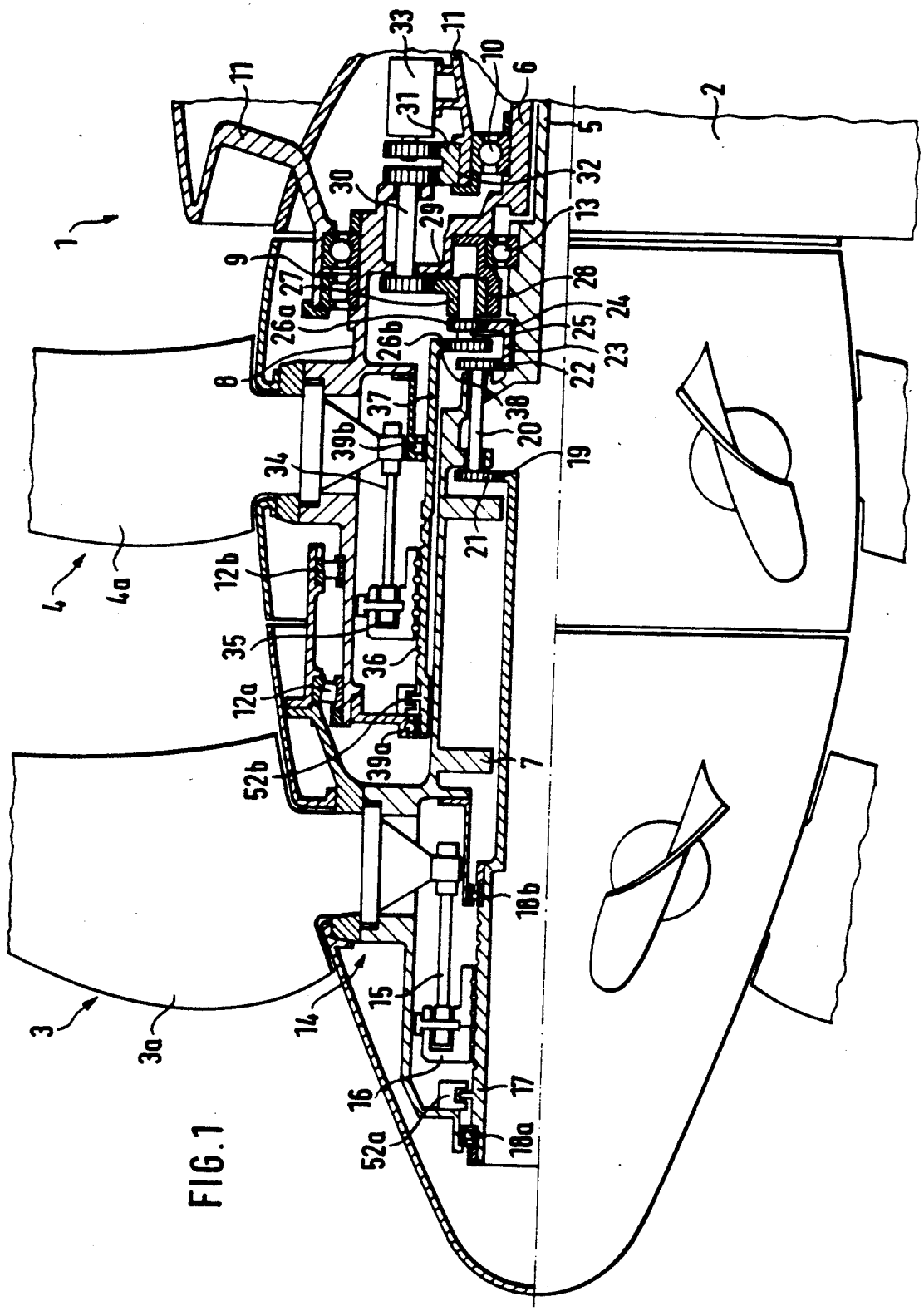
FIG. 1 is a partial longitudinal sectional view of a propfan turbo engine constructed according to a preferred embodiment of the invention.

The propfan turbo engine 1 shown in FIG. 1 comprises a gas turbine, which is not shown in detail, in area 2 which is connected with two counter-rotating rotor blade rings 3 and 4. The coupling between the gas turbine 2 and the rotor blade rings 3 and 4 takes place by means of two concentric shafts 5 and 6. Shaft 5 is connected by way of a first rotor 7 with a first rotor blade ring 3 and the concentric outer shaft 6 is connected with a second rear rotor blade ring 4 by way of a second rotor 8. The second, rear rotor 8 is disposed in the housing 11 by means of bearing arrangements 9 and 10. The first rotor 7, in turn, is disposed in the second rotor by means of bearings 12a, 12b and 13.

A shown rotor blade 3a of the first rotor blade ring 3 is pivotably disposed in the first rotor 7 by means of a schematically outlined guiding arrangement 14. In addition, the rotor blade 3a is connected with a first adjusting ring 16 by means of a first adjusting lever 15. The first adjusting ring 16 is in operative connection with a first ball spindle 17 which in turn is disposed in the first rotor 7 by means of roller bearings 18a and 18b.

The free end of the first ball spindle 17 has a toothing 19 which meshes with a plurality of spaced planet pins 20 by way of pin toothings 21. The planet pins 20 are rotatably disposed in the first rotor 7.

At their other end, the planet pins 20 have another pin toothing 22 which has the same reference diameter as the pin toothing 21. The pin toothings 22 of the planet pins 20 mesh with an adjusting wheel 23. The adjusting wheel 23 is rotatably disposed in the rotor 7 by means of a slideway 24. In addition, the adjusting wheel 23 meshes with a number of uniformly spaced planet wheels 25 by means of planet wheel toothings 26.

The planet wheels 25, in turn, are disposed in a ring-shaped web 27, the web 27, by means of slideways 28, being held rotatably in circumferential direction in the second rotor 8.

At its outer circumference, the web 27 has a web toothing 29 which mates with a number of regularly spaced planet pins 30. The planet pins 30 are rotatably disposed in the second rotor 8 and engage in a toothed ring 31 supported in the housing 11.

The toothed ring 31 can either be rigidly connected with the housing 11 or, as in the shown construction, by means of a slide bearing guide 32, may be rotatable in circumferential direction. In this case, the toothed ring 31 meshes with an adjusting motor 33 supported in the housing 11.

The shown rotor blade 4a, which is a component of the rear rotor blade ring 4, is disposed in the second rotor 8 so that it can be swivelled analogously to the rotor blade 3a. By means of a second adjusting lever 34, this rotor blade is kinematically coupled with a second adjusting ring 35 which, in turn, is coupled such with a second ball spindle 36 that, when the ball spindle 36 is rotated in circumferential direction, the adjusting ring can be moved in axial direction. The ball spindle 36 is connected with an adjusting ring 37 which, by means of an adjusting ring toothing 38, meshes with a second planet wheel toothing 26b. In this case the planet wheel toothings 26a and 26b are coordinated with one another such that, when the speed relationship of rotors 7 and 8 is fixed, there will be no relative movements of the adjusting rings 37 and 19. The adjusting ring 37, by means of bearings 39a and b, is disposed rotatably in circumferential direction in the second rotor 8.

Figure 2:
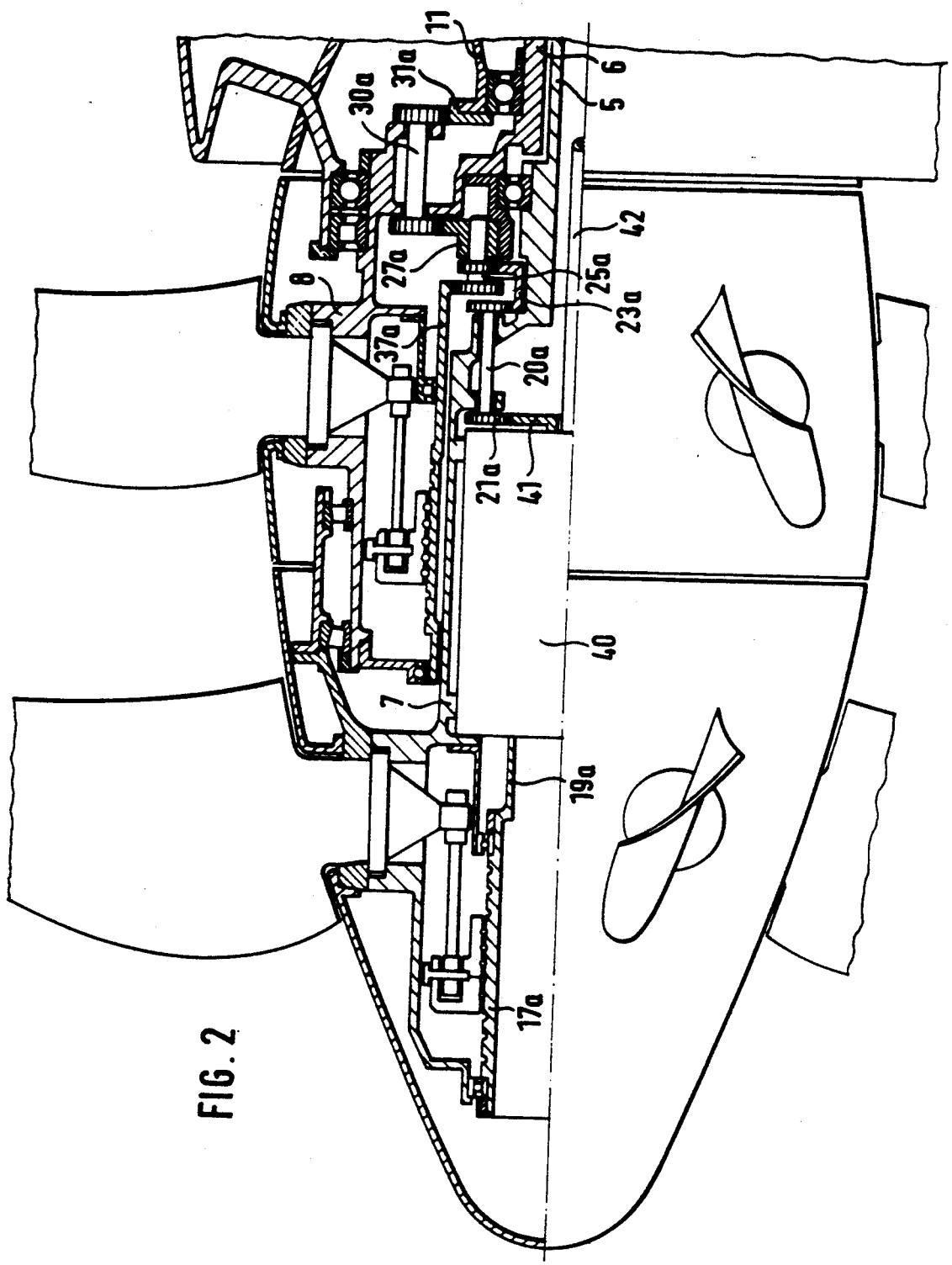
FIG. 2 is a partial longitudinal sectional view of a propfan turbo engine constructed according to another preferred embodiment of the invention.

The alternative embodiment of the invention shown in FIG. 2 is constructed essentially like the embodiment shown in FIG. 1. As a significant difference compared to the above-mentioned construction, the toothed ring 31a which is together with the planet pins 30a, is fastened to the housing 11 and in particular is screwed to it. Thus, relative to the housing 11, the web 27a is stationary because both toothings of the planet pins 30a have the same reference diameters. Thus, despite the second rotor 8 which rotates between the web and the housing 11, the web 27a may thus be considered to be fixed at the housing and is therefore suitable for supporting the forces occurring in the rotor blade rings 3 and 4.

In addition, in contrast to the first-mentioned construction, the first ball spindle 17a is not connected directly to the pin toothing 21a of the planet pins 20a. In contrast, an adjusting motor 40 is provided which is supported in the first rotor 7, this adjusting motor 40 is connected at its front axial end face with the adjusting ring 19a and can rotate this adjusting ring 19a in circumferential direction relative to the first rotor 7. At its rear end face, the adjusting meter motor 40 is connected with an adjusting wheel 41 which mates with the pin toothings 21a of the planet pins 20a. The adjusting wheel 41 can be rotated in the same direction as the adjusting ring 19a in circumferential direction with respect to the adjusting motor, the adjusting angle, by way of the planet pins 20a, the adjusting wheel 23a, the planet wheel 25a being transmitted to the adjusting ring 37a of the rear rotor blade ring 4.

The energy supply of the adjusting motor 40 takes place by means of the line 42 which takes place concentrically inside the two shafts 5 and 6 from the stator area behind the turbines driving them. Preferably, the adjusting motor 20 has a hydraulic construction so that hydraulic oil can be transported through the line 42. As an alternative, the adjusting motor 40 may also be constructed in a different manner, particularly electrically.

Figure 3:
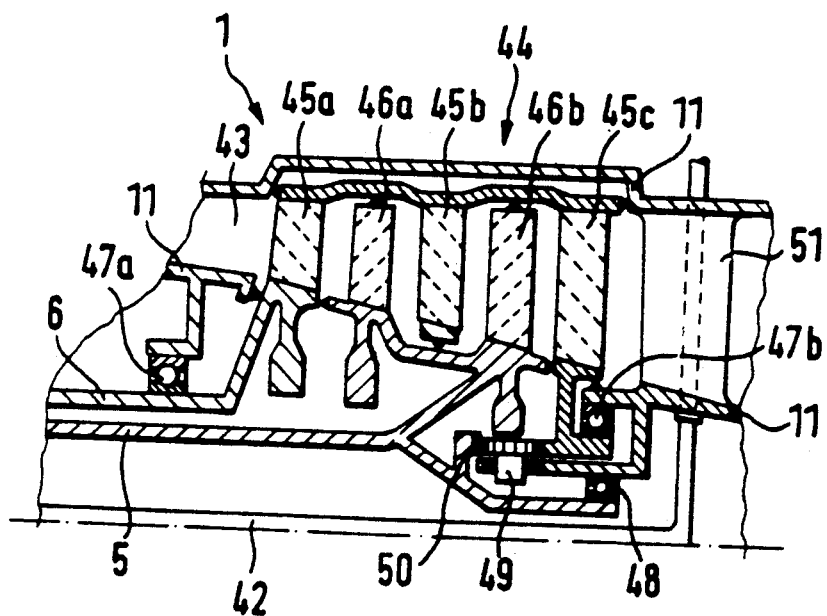
FIG. 3 is a longitudinal sectional view of a shaft synchronizing gear for use with the invention.

In FIG. 3, the turbine area of the propfan engine 1 is shown schematically. The hot gas flow arriving from the combustion chamber or gas generator turbine, which is not shown, acts upon the counter-rotating low-pressure turbine 44 by way of the ring-shaped flow duct 43. This low-pressure turbine 44 consists of three mutually coupled turbine stages 45a, b, c, which are coupled with the concentrically outer shaft 6. Two turbine stages 46a and 46b arranged in flow direction between them are coupled with one another and with the inner shaft 5. Turbine stages 45a, b, c are supported in the housing 11 by means of the bearings 47a and 47b. Turbine stages 46a and 46b are supported on the side of the housing by means of the bearing 48. A synchronizing gear 49 is disposed in the housing 11 and, by means of the synchronizing toothing 50, on one side, meshes with turbine stages 45 and the shaft 6 and, on the other side, with turbine stages 46 and the shaft 5.

Turbine stages 45 and 46 are constructed such that they rotate in opposite direction as a result of the hot gas flow, the precise maintaining of the oppositely commensurate rotational speed being forced by the synchronizing gear 49 arranged between the two.

In addition, FIG. 3 shows the line 42 which, by means of a hollow supporting rib 51, is connected with the space outside the engine, so that, as a result, the adjusting motor 40 can be controlled according to FIG. 2.

The adjustment of the rotor blade rings 3 and 4 according to FIG. 1 takes place as follows: Starting from an operating condition, in which an equilibrium exists between the rotor blade rings and the driving turbines, it is now assumed that the operating condition changes such that one rotor blade ring absorbs less work than the other one. The pertaining turbine stage will now try to increase its rotational speed. The rise of the rotational speed of the shaft will now cause the blade adjusting mechanism shown in FIG. 1 to adjust the blade such that the rotor blade ring will again absorb more work, whereby the rotational speed of the shaft is lowered again. If, on the other hand, one rotor blade ring is loaded more, the rotational turbine speed will decrease, the rotor blade ring is automatically swivelled into a position with less load, and the rotational turbine speed will rise again. This control applies to both rotor blade rings 3 and 4 because they are kinematically coupled with one another. In this case, the wheel system, particularly the planet wheel toothings 26a and b of the planet wheels 25, are designed such that, in the case of a commensurate but opposite rotational speed of the rotors 7 and 8, no relative movements take place in the adjusting system.

If load is removed, for example, from the rotor blade ring 3, it will endeavor to increase its rotational speed, because a larger torque is offered to it by the turbine (turbine stages 46a, b) by way of the shaft 5 and the first rotor 7. Assuming that no load change occurs in the rotor 8 or in the rotor blade ring 4, this rotor blade ring 4 at first has no reason to change its rotational speed. This means that nothing changes with respect to the sequences of movement at the web 27 and at the adjusting ring 37. This means for web 27 that, as previously, it remains stationary relative to the housing 11.

With the rotational speed increase of the shaft 5 and the connected rotor 7, if no relative movements of the individual wheels of the rotor 7 take place with respect to one another, the rotational speed of the adjusting wheel 23 would also increase. Since, however, such a change is not possible, a relative movement of the adjusting wheel 23 must take place relative to the rotor 7 which, by way of the planet pins 20 and the adjusting ring 19, is transmitted to the ball spindle 17.

By means of the rotating of the ball spindle 17, the adjusting ring 16 is axially shifted, whereby, by way of the adjusting lever 15, the rotor blade 3a of the rotor blade ring 3 is swivelled. When, in this case, the rotor blade ring 3 is rotated such that it arrives in a position of a higher absorption of work, this, in turn, results in a rotational speed reduction of the rotor blade ring 3 and of the rotor 7 and the shaft 5. The relative movement and the connected blade adjustment is necessarily carried out so long until a rotational speed equilibrium is reestablished between the rotors 7 and 8 or the rotor blade rings 3 and 4. This also takes place, when instead of rotor blade ring 3, rotor blade ring 4 takes on a different condition of moments.

Thus, the rotational speed adaptation may take place by means of each of the two rotors 7, 8, specifically, individually or combined. A pitch lock is required for a targeted adaptation of rotational speeds of one of the two rotors to the other one, by means of which the adjustment of one of the two rotor blade rings may be prevented in a targeted manner. This takes place, for example, by means of the pitch locks 52a and 52b shown in FIG. 1 which prevent a rotating of the ball spindles 17 and 36 with respect to the rotors 7 and 8. When it is necessary to adjust the blades, a targeted rotational speed adaptation will take place by means of the corresponding release of the respective pitch lock 52a, b.

The targeted adjustment of the rotor blade rings 3 and 4, particularly the adjustment of a thrust reversal position, takes place by means of the adjusting motor 33 which turns the toothed ring 31a and thus, by way of the planet pin 30, the web 27 relative to the housing in circumferential direction.

The construction of the invention shown in FIG. 2 functions analogously, except that the two shafts 5 and 6, by means of the synchronizing gear 49 shown in FIG. 3, rotate at a precisely oppositely identical speed. The adjustment takes place by means of the adjusting motor 50, in which case the adjusting ring 19a connected with it and the adjusting wheel 41 may be controlled separately. As a result, an individual adjustment of the rotor blade rings 3 and 4 can be achieved in which case the pitch locks 52a and b shown in FIG. 1 are not necessary.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for adjusting the rotor blades of a propfan turboprop engine, which has two counter-rotating propfan rotors which are driven by two turbines by means of separate concentrical shafts disposed in a housing, having first and second adjusting rings which can be rotated in circumferential direction and which are kinematically coupled with respective first and second rotor blade rings which are arranged axially behind one another, wherein the adjusting rings are coupled by means of a planet wheel gear which has a number of double-toothed planet wheels which are fastened to a rotatably disposed web, the rotatably disposed web having at its outer circumference a toothing which meshes with a first toothing of a planet pin, said planet pin being rotatably supported on one of the propfan rotors and wherein a second toothing of said planet pin meshes with a third toothing supported on the side of said housing for introducing adjustment reaction forces into said housing and further wherein said number of double-toothed planet wheels which are in operative connection with said first and second adjusting rings are dimensioned such that at a predetermined fixed rotational speed ratio of said propfan rotors, no relative movements occur of the adjusting rings.

2. An arrangement according to claim 1, wherein the first adjusting ring used for the adjustment of the first rotor blade ring is connected by means of planet pins disposed in the first rotor with an adjusting wheel which engages with one of the toothings of the planet wheels respectively.

3. An arrangement according to claim 1, wherein the second adjusting ring, which is used for the adjustment of the second rotor blade ring, is constructed as a ring gear which meshes with the second toothings of the planet wheels.

4. An arrangement according to claim 2, wherein the second adjusting ring, which is used for the adjustment of the second rotor blade ring, is constructed as a ring gear which meshes with the second toothings of the planet wheels.

5. An arrangement according to claim 1, wherein the planet members are disposed in the second rotor and with two equally large toothings mesh with the web, on the one side, and with a toothed ring supported in the housing, on the other side.

6. An arrangement according to claim 2, wherein the adjusting wheel is disposed rotatably in circumferential direction in the first rotor and, radially from the inside, meshes with the first toothings of the planet wheels.

7. An arrangement according to claim 1, wherein the planet pins have two pin toothings of the same reference diameter which are provided at its opposite ends.

8. An arrangement according to claim 1, wherein the planet toothings are selected such that the rotor blade rings rotate at an oppositely identical speed.

9. An arrangement according to claim 1, wherein the adjusting rings are connected with ball spindles which are coupled by means of adjusting nuts and adjusting levers with the rotor blades.

10. An arrangement according to claim 1, wherein an adjusting motor is supPorted in the first rotor and is in operative connection with both adjusting rings.

11. An arrangement according to claim 10, wherein the adjusting motor has a hydraulic construction.

12. An arrangement according to claim 10, wherein the adjusting motor is arranged axially between the first adjusting ring and the planet pin and is connected with the first adjusting ring and, on the side of the shaft piece, an adjusting wheel which is connected with the adjusting motor meshes with the planet pins.

13. An arrangement according to claim 5, wherein the toothed ring is disposed rotatably in circumferential direction in the housing.

14. An arrangement according to claim 5, wherein the adjusting motor is arranged axially between the first adjusting ring and the planet pin and is connected with the first adjusting ring and, on the side of the shaft piece, an adjusting wheel which is connected with the adjusting motor meshes with the planet pins.

15. An arrangement according to claim 14, wherein the toothed ring can be moved by means of an adjusting motor supported in the housing.

16. An arrangement according to claim 1, wherein both rotor blade rings are equipped with pitch locks.

* * * * *